United States Patent [19]

Hoover et al.

[11] Patent Number: 4,950,955
[45] Date of Patent: Aug. 21, 1990

[54] MAGNETIC FIELD COMPENSATOR FOR A CRT

[75] Inventors: Alan A. Hoover, New Palestine; Kenneth W. McGlashan, Indianapolis, both of Ind.

[73] Assignee: RCA Licensing Corporation, Princeton, N.J.

[21] Appl. No.: 240,321

[22] Filed: Sep. 6, 1988

[51] Int. Cl.[5] ............................................. H01J 29/06
[52] U.S. Cl. ......................................... 315/8; 315/85; 361/150
[58] Field of Search ....................... 315/8, 85; 361/150

[56] References Cited

U.S. PATENT DOCUMENTS

| | | | |
|---|---|---|---|
| 2,921,226 | 1/1960 | Vasilevskis | 315/8 |
| 2,925,524 | 2/1960 | Heil | 315/8 |
| 4,380,716 | 4/1983 | Romeo et al. | 315/8 |
| 4,535,270 | 8/1985 | Frantz et al. | 315/8 |
| 4,636,911 | 1/1987 | Truskalo | 315/8 X |
| 4,742,270 | 5/1988 | Fernsler et al. | 315/8 |
| 4,760,489 | 7/1988 | Truskalo | 315/8 X |

OTHER PUBLICATIONS

"Development of a Microcomputer-Based Magnetic Heading Sensor", H. Douglas Garner, presented at the Sensors Expo Conference, Detroit, Sep. 15-17, 1987.

Primary Examiner—Eugene R. LaRoche
Assistant Examiner—Do H. Yoo
Attorney, Agent, or Firm—Joseph S. Tripoli; Joseph J. Laks; Sammy S. Henig

[57] ABSTRACT

In a television receiver, a magnetic field compensator of a horizontal component of the earth's magnetic field includes a fluxgate magnetometer having a pair of sensing windings for generating first and second sensing signals representative of corresponding components of the horizontal component of the earth's magnetic field. The sensing signals generate current in a pair of substantially planar coils disposed in a non-parallel vertical configuration on the rear periphery of a cathode ray tube. The currents in the coils produce a magnetic field that compensates or neutralizes the effect of the horizontal component of the earth's magnetic field on the electron beam in the cathode ray tube. Whenever the position of the receiver is changed, rotationally or geographically, the current in the coils is automatically adjusted to provide automatic neutralization.

15 Claims, 5 Drawing Sheets

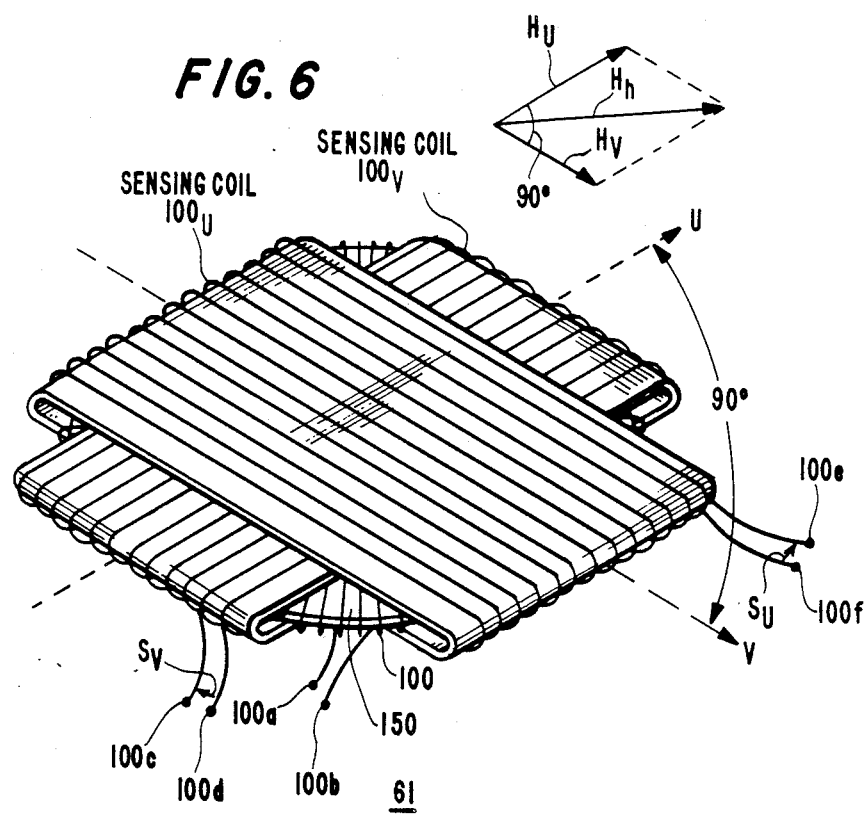

MAGNETIC FIELD COMPENSATOR FOR A CRT

The invention relates to an automatic cancellation of external magnetic fields, and, in particular, to apparatus for compensating for an external magnetic field affecting the operation of a cathode ray tube (CRT) display.

The earth's magnetic field in the northern hemisphere is characterized by magnetic lines of force dipping downward and toward what is commonly referred to as the earth's north magnetic pole, but which by electromagnetic theory is actually a south magnetic pole. At a point of one of the lines of force a vector H may be drawn to represent the direction and intensity of the earth's field, as shwon in FIG. 5. The vector H that is substantially uniform at any geographical location may be separated into vertical horizontal components, $H_y$ and $H_h$, respectively. For the continental United States the horizontal intensity $H_h$ in the direction of the magnetic North varies from about 0.27 gauss in the southern parts to about 0.16 gauss in the northern parts.

Color purity correction in a color television receiver tends to be adversely affected by the earth's magnetic field. An example of such a color television receiver is the shadow mask receiver. In such a color television receiver, the CRT has three electron guns and has an apertured mask through which the electron beams pass to impinge upon the screen which has phosphor stripes thereon emissive of light of different colors. For proper color rendition, it is desirable that the electron beams be properly directed and properly convergent so that at each scanning instant when an elemental area of the color image is being reproduced, the electron beams will pass through the correct aperture of the mask and impinge on the proper phosphor stripe of the screen.

A CRT having a large screen, such as a 32-inch CRT, may be more sensitive to the earth's magnetic field than a CRT having a small screen. Greater sensitivity may exist for 32-inch CRT than to a smaller screen CRT because a given bending of the electron beam path caused by the earth's magnetic field results in a larger landing distance change on the face of the larger screen CRT. A larger landing distance change requires a tighter tolerance for color purity. Such sensitivty to the earth's magnetic field may occur even when a magnetic shield is used, since ideal magnetic shielding is not feasible.

In a given geographical location, the effect of the vertical component $H_y$ on the electron beams that affects the color purity in a CRT 10 of FIG. 5 is substantially the same at any directional angle δ of CRT 10. Directional angle δ is defined as the angle between an electron beam axis Z of CRT 10 and the direction of the magnetic North. Therefore, automatic neutralization of the vertical component $H_y$ as a function of the directional angle δ may not have a significant effect on color purity. On the other hand, after CRT 10 is rotated in the horizontal plane by, for example, an operator, a situation encountered in normal usage of television receiver, directional angle δ changes. It is well known that a change of angle δ may tend to degrade or reduce the tolerance of the color purity in CRT 10. It may be desirable to neutralized the horizontal component $H_h$ of the earth's magnetic field when directional angle δ changes.

In a magnetic field compenstator of a television apparatus, embodying an aspect of the invention, a fluxgate magnetometer is used for generating first and second magnetic field sensing signals representative of corresponding magnetic field components of horizontal component $H_h$ of the earth's magnetic field. The sensing signals are applied to a pair of substantially planar coils disposed in nonparallel, side-by-side vertical direction arrangement fitted on the periphery of the CRT. The sensing signals are used for generating corresponding currents in the coils that compensate or neutralize the effect of the horizontal component $H_h$ of the earth's magnetic field on the electron beam inside the CRT. Whenever the position of the receiver is changed, rotationally or geographically, the currents in the coils are automatically adjusted to compensate for the effect of the horizontal component $H_h$ of the earth's magnetic field.

Thus, neutralization is obtained by directly interacting and sensing the horizontal component $H_h$ of the earth's magnetic field by means of the transducing magnetometer. The magnetometer generates the sense signals in a manner that is independently derived from the generation of the electron beam in CRT 10. The sense signals are independent of and unaffected by the beam landing position on the CRT screen. In contrast, in one prior art compensator, an optical output produced on the CRT screen by the electron beam is utilized for sensing the effect of the earth's magnetic field on the electron beam and for generating a neutralizing magnetic field in accordance with the direct effect of the earth's magnetic field on the electron beam landing position. Such prior art arrangement, disadvantageously, requires a complicated optical interface to the CRT screen for monitoring the electron beam landing position on the CRT screen and a complicated signal processing arrangement that may not be cost effective.

In accordance with another aspect of the invention, an apparatus for neutralizing a first magnetic field that undesirably affects electron beam landing in a video apparatus includes an arrangement responsive to the first magnetic field for generating a first sense signal that is indicative of a magnitude of the first magnetic field. A first current that is determined in accordance with the first magnetic field in generated. A first magnetic field neutralizing coil coupled to conduct the first current produces the neutralizing second magnetic field. The second magnetic field is at a magnitude that is in accordance with the magnitude of the first magnetic field. The second magnetic field automatically neutralizes the first magnetic field when a change in a position of the video apparatus occurs. FIG. 1 illustrates an arrangement, embodying an aspect of the invention, including a magnetometer and neutralizing coils for neutralizing the effect of the horizontal component of the earth's magnetic field on an electron beam of a CRT, shown in FIGS. 2, 3 and 4;

FIG. 6 illustrates a fluxgate magnetometer of the arrangement of FIG. 1 and a vectorial diagram useful for the explanation of the operation of the magnetometer.

Figure 1:
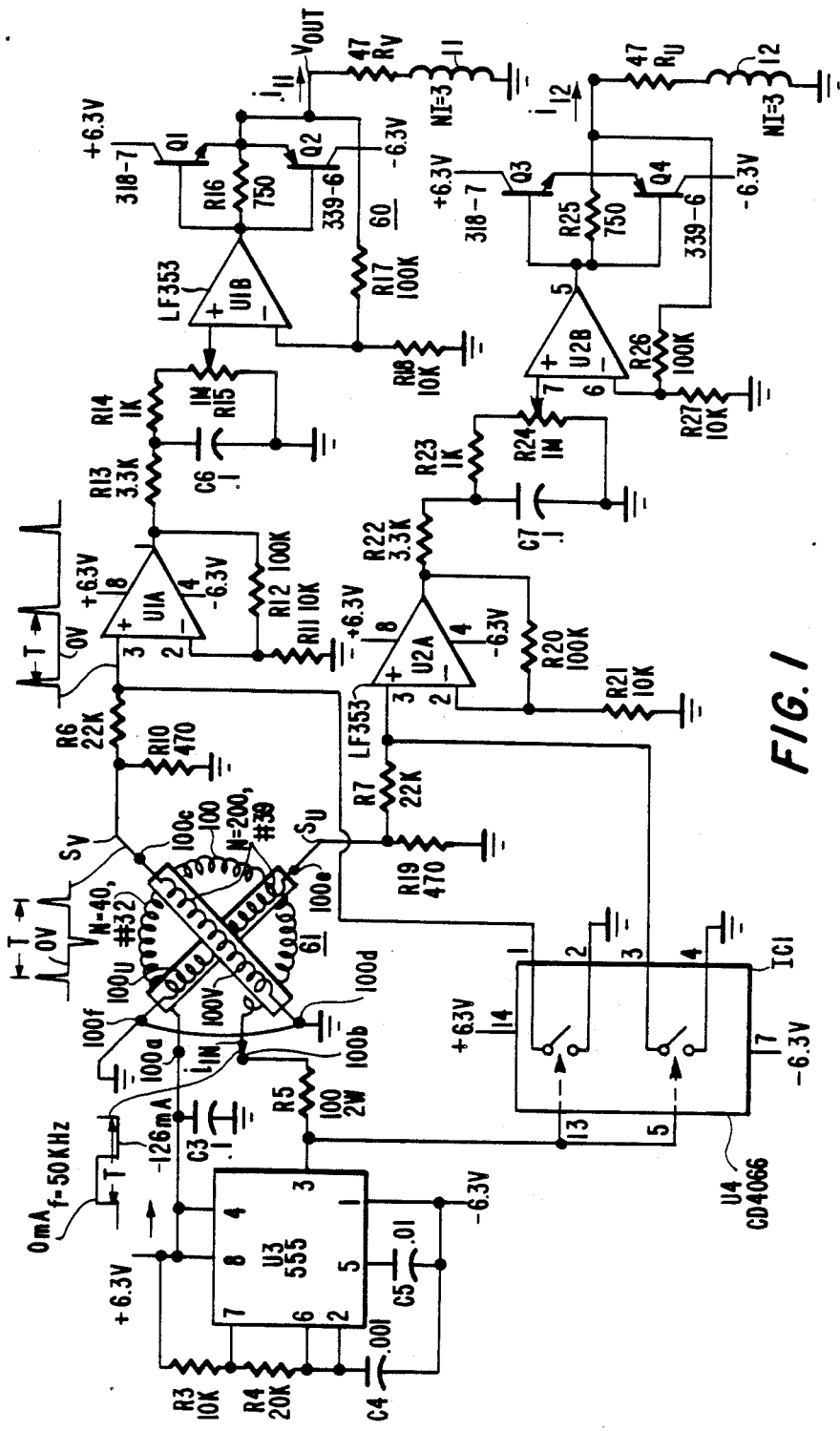
Figure 5:
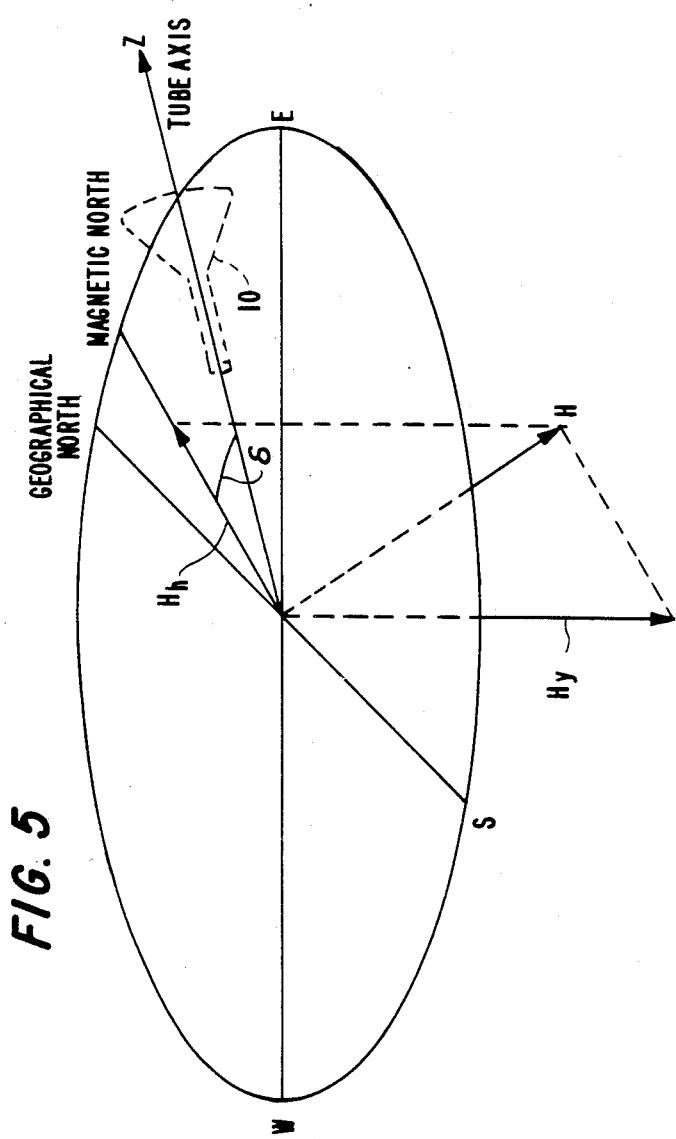
FIG. 5 is a vectorial diagram representing the lines of force of the earth's magnetic field relative to an electron beam path of a CRT.

FIG. 1 illustrates a fluxgate magnetometer 61 and a current driver arrangement, embodying an aspect of the invention, of, of example, a television receiver, for generating current $i_{11}$ and $i_{12}$ that are applied to magnetic field neutralizing coils 11 and 12, respectively. As described later on, coils 11 and 12 are fitted near CRT 10 of FIG. 5 of the televison receiver. Fluxgate magnetometer 61 of FIG. 1 includes a drive winding 100 and a pair of sensing windings $100_U$ and $100_V$, having axes U and V, respectively, that are, for example, perpendicular. The windings are constructed in the manner shown in FIG. 6. Similar symbols and numerals in FIGS. 1, 5 and 6 illustrate similar items or functions. Coils 11 and 12 of FIG. 1 produce magnetic fields that are applied to the electron beam path of CRT 10 of FIG. 5 for neutralizing the horizontal component of the earth's field, as described later on.

A saturable toroidal core 150 of magnetometer 61 of FIG. 6 on which windings $100_V$ and $100_U$ are wound, is alternately saturated and unsaturated. This is accomplished by surrounding coil 150 with a toroidal drive winding 100, which is excited by an approximately square wave current $i_{in}$ of FIG. 1. Square wave current $i_{in}$, alternating from a positive value to a zero value at a frequency of, for example, 50 kHz, is applied to input terminals 100a and 100b of drive winding 100. During transition times of current $i_{in}$, toroidal core 150 of FIG. 6 is unsaturated. Between transition times of current $i_{in}$, the core is saturated.

Toroidal core 150 and toroidal drive winding 100, confine the magnetic field produced by drive winding 100 to circular core 150 itself, so that, by itself, the circular magnetic field, that is produced as a result of current $i_{in}$ induces a voltage at only a negligible amplitude into sensing windings $100_V$ and $100_U$. The geometric symmetry of the toroidal core permits the use of more than one sensing winding on a single saturating core. The successful use of more than one sensing winding on a single core is contingent upon the selection of a core exhibiting uniform magnetic properties anc cross-sectional area around its circumference.

When core 150 of FIG. 6 becomes unsaturared, during transitions of current $i_{IN}$ of FIG. 1, the permeability of core 150 of FIG. 6 is high. Therefore, the core material acts as a low impedance path to lines of magnetic flux in the surround environment, formed by horizontal component $H_h$ of the earth's magnetic field. When the core material is saturated, and its permeability is low, it no longer presents a low impedance path for external lines of flu, and they return to their original paths. Each time the core passes from the saturated state to the unsaturated state, the surrounding flux lines are drawn into it, cutting the winding turns of sensing windings $100_U$ and $100_V$ surrounding the core and inducing a voltage pulse $S_U$ in sensing winding $100_U$ and a voltage pulse $S_V$ in sense winding $100_V$. Each time the core passes from the unsaturated to the saturated state, the flux lines caused by horizontal component $H_h$ of the earth's magnetic field are driven out of the core, generating a pulse of equal amplitude, but of opposite polarity.

Pulses $S_V$ of FIG. 1 are applied to an input terminal of an amplifier U1A through a resistor R6. A half-wave, phase-sensitive demodulator of pulses $S_V$ is implemented with an analog switch arrangement IC1, operating synchronously with current $i_{in}$ for shorting out the signal at the input terminal of amplifier U1A that is produced by sensing winding $100_V$ during the occurence of alternate pulses of pulses $S_V$. Such alternate pulses occur when core 150 of FIG. 6 goes out of saturation. The other alternate pulses of pulses $S_V$ of FIG. 1, occurring when core 150 of FIG. 6 goes into saturation, are applied to the input terminal of amplifier U1A of FIG. 1 to form a demodulated portion of signal $S_V$. The demodulated portion of signal $S_V$ is voltage amplified in amplifier U1A, low pass filtered by a capacitor C6 and applied via a variable voltage divider that includes a resistor R15 to an input terminal of a voltage amplifier U1B having a power stage 60 that includes transistor Q1 and Q2.

In accordance with an aspect of the invention, an output voltage $V_{out}$ of output stage 60 that is indicative of horizontal components $H_h$ of the earth's magnetic field of FIG. 6 is applied via a resistor $R_V$ to neutralizing coil 11 to FIG. 1. Variable resistor R15 is used for adjusting the level of current $i_{11}$. In a similar manner, current $i_{12}$, that is adjustable by adjusting a resistor R24, is generated from pulses $S_U$ and flows in coil 12. As explained later on, neutralizing coils 11 and 12 produce corresponding magnetic fields that neutralize the horizontal component $H_h$ of the earth's magnetic field automatically at any directional angle $\delta$ between the electron beam axis Z of CRT 10 of FIG. 5 and the magnetic north.

Assume that pulses $S_V$ and $S_U$ of FIG. 1, that are used for generating current $i_{11}$ and $i_{12}$, respectively, are unaffected by the magnetic fields that are produced by coils 11 and 12 of FIG. 1. Such assumption is justified when the fluxgate magnetometer is located inside the television receiver cabinet, not shown in the FIGURES, but sufficiently far from coils 11 and 12.

As shown in the vectorial diagram of FIG. 6, horizontal component $H_h$ has a direction that forms corresponding angles with axes U and V, respectively. Consequently, horizontal component $H_h$ may be vectorially separated into a first component $H_U$ having a direction that is coaxial with axis U and a second component $H_V$ having a direction that is coaxial with axis V and that is perpendicular to axis U.

At any directional angle $\delta$ of CRT 10 of FIG. 5, the amplitude of pulses $S_V$, for example, produced between terminals 100e and 100d of sensing winding $100_V$ of FIG. 1 is linearly proportional to the intensity of the surround magnetic field component $H_V$ which lies parallel to the axis V of sensing winding $100_V$ of FIG. 6. The amplitude of pulses $S_V$ of FIG. 1 is unaffected by component $H_U$ horizontal component $H_h$ of FIG. 6 that is perpendicular to axis V. The polarity of pulses $S_V$ of FIG. 1 depends upon the vertorial direction of component $H_V$ with respect of sensing winding $100_V$ of FIG. 6 that, in turn, is determined by directional angle $\delta$ of FIG. 5. The polarity and amplitude relationship between pulses $S_U$ of sensing winding $100_U$ and field component $H_U$ is analogous to that between pulses $S_V$ and field component $H_V$.

The ratio between the amplitude of pulses $S_V$ and the magnitude of the corresponding component $H_V$ is unaffected by the directional angle $\delta$ OF CRT 10 of FIG. 5. Similarly, the ratio between the magnitude of pulses $S_U$ of FIG. 1 and that of component $H_U$ of FIG. 6 is unaffected by angle $\delta$. In this way, pulses $S_V$ and $S_U$ are representative of components $H_V$ and $H_U$, respectively.

Because current $i_{11}$ of FIG. 1 is linearly proportional to pulses $S_V$, it is also linearly proportional to component $H_V$ of FIG. 6 and is unaffected by component $H_U$ of the horizontal component $H_h$ of the earth's magnetic field. Similarly, current $i_{12}$ in coil 12 of FIG. 1 is linearly proportional to component $H_U$ of FIG. 6 but uneffected by component $H_V$ of the horizontal component $H_h$ of the earth's magnetic field.

Figure 2:
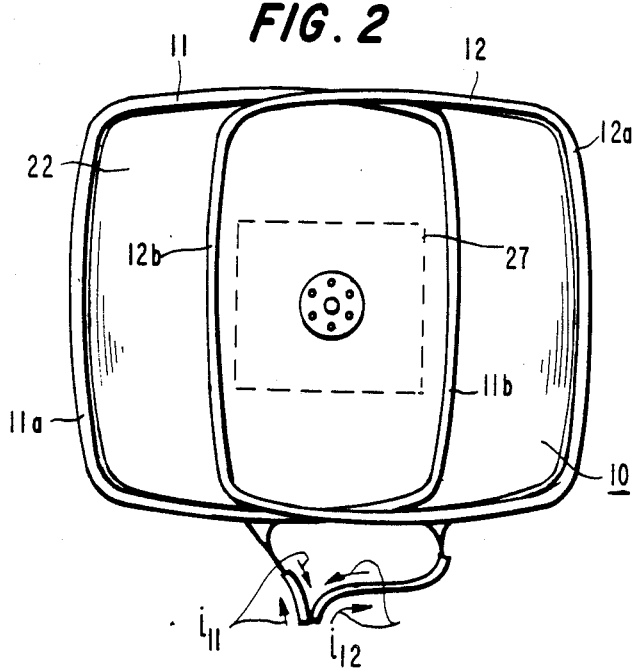
FIG. 2 is a back view of the CRT that is to be magnetically neutralized.
Figure 3:
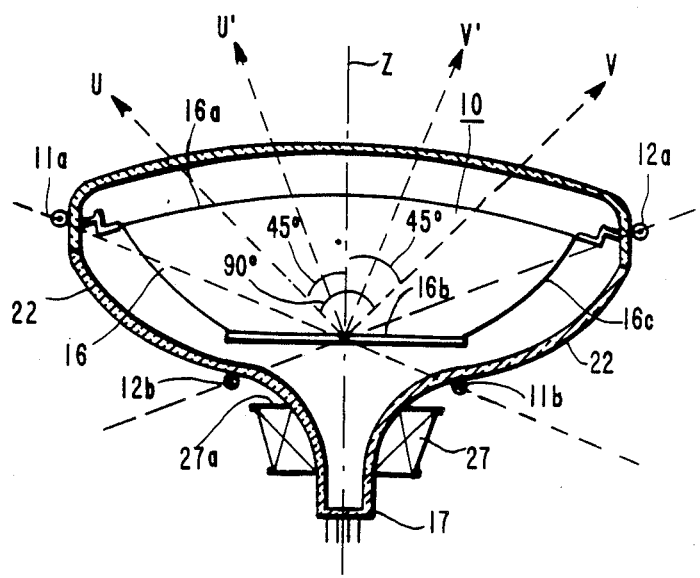
FIG. 3 is a sectional view of the CRT of FIG. 2.
Figure 4:
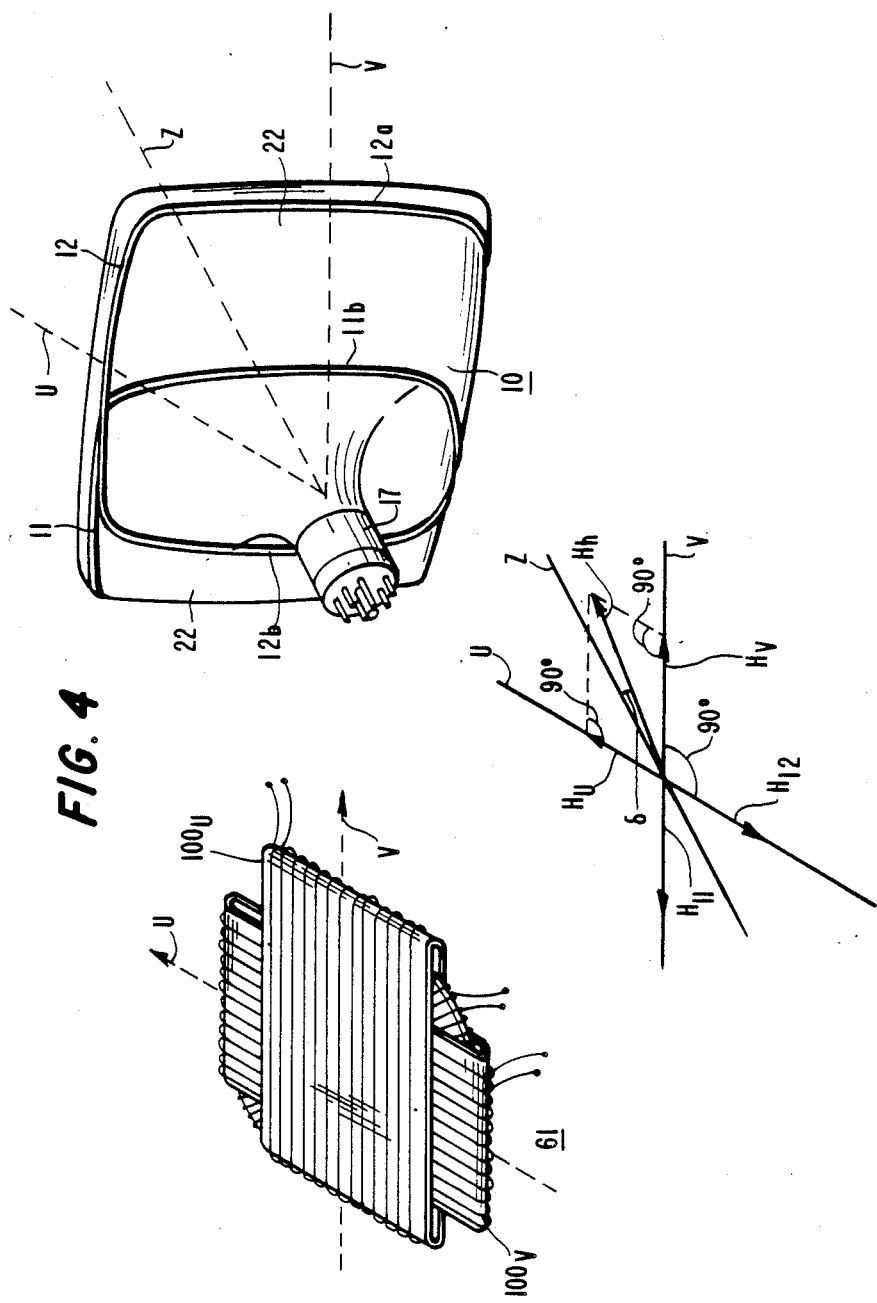
FIG. 4 illustrates a perspective view of the CRT of FIG. 2 fitted with a pair of magnetic field neutralizing coils, the magnetometer of FIG. 1 and a vectorial diagram representing horizontal magnetic field components useful for explaining magnetic field neutralization by the coils.

Each of FIGS. 2, 3 and 4 illustrates neutralizing coils 11 and 12 of FIG. 1 mentioned before, that are fitted on CRT 10 of FIG. 5. Coils 11 and 12 of FIG. 1 are used for producing a resultant neutralizing magnetic field that neutralized the effect of horizontal component $H_h$ of the earth's magnetic field on the electron beam in CRT 10 of FIG. 5. Similar symbols and numerals in FIGS. 1-6 indicate similar items or functions.

Neutralizing coils 11 and 12 of FIG. 3 are fitted along the outer periphery of CRT 10 to spatially surround a magnetic shield 16 of FIG. 3 received in a conical section 22 of CRT 10. Inner vertical portions 11b and 12b of neutralizing coils 11 and 12, respectively, partly surround a neck section 17 of CRT 10 and intersect each other at vertically disposed two opposite points across neck section 17. Inner portions 11b and 12b are disposed between a rear end portion 16b of magnetic shield 16 and a forward end portion 27a of a deflection yoke arrangement 27. Outer portions 11a and 12a of coils 11 and 12, respectively, are positioned near a shadow mask 16a, which is also part of magnetic shield 16, in parallel relationship with inner portions 11b and 12b, respectively. The number of turns in each coil may be such so as to provide the required number of ampere-turns, such as, three, for example. It should be understood that deflection yoke arrangement 27 is not shown in FIG. 4 so as to provide a better view of coils 11 and 12.

When CRT 10 of FIG. 3 is placed relative to a horizontal plane in a position similar to its posiion in normal usage, portions 11a and 11b of coil 11 define a vertical plane having an axis V' of coil 11 that is perpendicular to such horizontal plane. The spatial orientation between coil 11 and winding $100_V$ of fluxgate magnetometer 61, shown in FIG. 4, is arranged such that the axis V of winding $100_V$ is close to being in parallel with the axis V' of coil 11 as shown in FIG. 3. In a like manner, coil 12 defines a corresponding vertical plane having an axis U' of FIG. 3 that is close to being in parallel with axis U of winding $100_U$. Magnetometer 61 of FIG. 4 is secured in a cabinet of the television receiver, not shown in the Figures, behind the back portion of CRT 10 of, for example, FIG. 4. The orientation of axes U and V of magnetometer 61 relative to CRT 10 is shown in FIG. 3. Axes U and V are disposed approximately symmetrically relative to axis Z of CRT 10.

Current $i_{11}$, flowing in the winding turns of coil 11 of FIGS. 3 or 4, produces a linearly proportional neutralizing magnetic field shown in the vectorial diagram $H_{11}$ of FIG. 4 outside magnetic shield 16 of CRT 10 of FIG. 3 in a volume that include magnetic shield 16 and the electron beam path of CRT 10.

Assume that neutralizing magnetic field $H_{11}$, shown by the vectorial diagram of FIG. 4, is uniform, perpendicular to axis U and coaxial with axis V of winding $100_V$. Similarly, assume that current $i_{12}$, flowing in coil 12, produces a neutralizing magnetic field $H_{12}$ of FIG. 4 that is uniform, perpendicular to axis V and coaxial with axis U. It should be understood that the above mentioned assumptions represent only an approximation that is used for simplifying the explanation.

The magnitude and polarity of current $i_{11}$ of FIG. 1 may be manually adjusted by varying resistor R15 so as to produce magnetic field $H_{11}$ of FIG. 4 at the opposite direction and at the same magnitude of component $H_V$. Thus, magnetic field $H_{11}$ neutralizes component $H_V$ or reduces the effect of component $H_V$ of horizontal component $H_h$ of the earth's magnetic field on the electron beam of CRT 10. Such adjustment of current $i_{11}$ of FIG. 1 is made in a given geographical location such as, for example, at the factory and at a given directional angle $\delta$ of CRT 10 of FIG. 5. Similarly, current $i_{12}$ of FIG. 1 is manually adjusted so as to produce magnetic field $H_{12}$ that neutralizes component $H_U$. By neutralizing components $H_V$ and $H_U$, horizontal component $H_h$ of the earth's magnetic field is neutralized.

Current $i_{11}$ that produces magnetic field $H_{11}$ of FIG. 4 is linearly proportional to component $H_V$, as described before. Magnetic field $H_{11}$ is linearly proportional to component $H_V$, is in a direction that opposes that of component $H_V$ and is unaffected by component $H_U$. The above mentioned relationship between magnetic field $H_{11}$ and component $H_V$ is maintained at any directional angle $\delta$ of CRT of FIG. 5. A similar, corresponding relationship between magnetic field $H_{12}$ of FIG. 4 and component $H_U$ is also maintained at any angle $\delta$.

Consequently, in accordance with a feature of the invention, once currents $i_{11}$ and $i_{12}$ of FIG. 1 are adjusted in the manner described before, neutralization of horizontal component $H_h$ of the earth's magnetic field is maintained automatically, that is without manual or operator intervention, at any other directional angle $\delta$ of CRT 10 and at an other geographic location.

It should be understood that even though the assumptions made before represent only an approximation, a sufficient cancellation or neutralization of the horizontal component $H_h$ of the earth's magnetic field is obtained at any angle $\delta$ of CRT 10 of FIG. 5.

What is claimed is:

1. An apparatus for neutralizing a first magnetic field component to prevent said first magnetic field component from undesirably affecting electron beam landing in a cathode ray tube of a video apparatus, comprising:
   a first sensing winding responsive to said first magnetic field component for generating a first sense signal that is indicative of a magnitude of said first magnetic field component and that the varies when said first magnetic field component varies;
   means responsive to said first sense signal for generating a first current that is determined in accordance with said first magnetic field component; and
   a first magnetic field neutralizing coil coupled to said first current generating means for producing a neutalizing second magnetic field in said video apparatus at a magnitude that varies in accordance with said magnitude of said first magnetic field component such that said second magnetic field automatically neutralizes said first magnetic field component when a change in a position of said cathode ray tube occurs.

2. An apparatus according to claim 1 wherein said first sensing winding comprises a sense winding of a fluxgate magnetometer.

3. An apparatus according to claim 1 further comprising, a second magnetic field neutralizing coil for producing a neutralizing third magnetic field such that said second and third magnetic fields neutralize the effect of corresponding field components of the horizontal component of the earth's magnetic field on an electron beam in said cathode ray tube.

4. An apparatus according to claim 3 wherein said first and second neutralizing coils comprise substantially planar coils disposed in corresponding nonparallel vertical planes when said cathode ray tube is placed in a normal usage position.

5. An apparatus according to claim 4 wherein said neutralizing coils are arranged sysmmetrically in proximate relation to a flared envelope portion of said cathode ray tube.

6. An apparatus according to claim 3 wherein corresponding portions of said first and second neutralizing coils intersect each other a two opposite vertically positioned intersection points.

7. An apparatus according to claim 1 further comprising, a second magnetic field neutralizing coil having an axis that is disposed in a nonparallel manner with an axis of said first magnetic field neutralizing coil and a second sensing winding having an axis that is disposed in a nonparallel manner relative to an axis of said first sensing winding such that said axes of said neutralizing coils are oriented in a predetermined manner relative to said axes of said sensing windings for producing a second sense signal in said second sensing winding, wherein said second sense signal is applied to said second coil for producing in accordance therewith a neutralizing third magnetic field in said second neutralizing coil.

8. An apparatus according to claim 7 wherein said first sensing winding has an axis that is disposed approximately in the same directed as an axis of said first neutralizing coil and wherein an axis of said second sensing winding is disposed approximately in the same direction as an axis of said second neutralizing coil.

9. An apparatus according to claim 7 wherein the axes of said sensing windings are substantially perpendicular.

10. An apparatus according to claim 7 wherein said sensing winding comprise a pair of sense windings of a two-axis fluxgate magnetometer and wherein said magnetometer is secured to said video apparatus in a predetermined orientation relative to said cathode ray tube.

11. An apparatus according to claim 1 further comprising, a second magnetic field neutralizing coil, said first and second substantially planar neutralizing coils disposed in corresponding vertical planes, when said cathode ray tube is placed in a normal usage position, and are arranged symmetrically in proximate relation to a flared envelope portion of a cathode ray tube so as to produce, in resonse to currents flowing in said coils, corresponding magnetic fields in counteracting relation to corresponding magnetic field components of the horizontal component of the earth's magnetic field and means responsive to said sense signal for supplying said currents to said coils such that said magnetic fields produced by said coils substantially compensate for said magnetic field components of the horizontal component of the earth's magnetic field.

12. An apparatus according to claim 1 wherein said first magnetic field component that is to be neutralized comprises a corresponding component of the horizontal components of the earth's magnetic field that is in a predetermined angle relative to an axis of said cathode ray tube.

13. An apparatus according to claim 1 wherein a ratio between a magnitude of said first sense signal and a magnitude of a component of the horizontal component of the earth's magnetic field that is in a predetermined direction relative to said neutralizing second magnetic field is maintained approximately the same at any directional angle of said cathode ray tube.

14. An apparatus according to claim 1 wherein said coil includes first and second portions that are disposed in corresponding nonparallel planes.

15. An apparatus for neutralizing an undesirable effect of the earth's magnetic field on an electron beam landing in a cathrode ray tube, comprising:
 a transducer, directly interacting with the earth's magnetic field, for generating a first sense signal independently of said electron beam landing position and unaffected thereby, said first sense signal being indicative of a magnetic field component produced by the earth's magnetic field;
 means responsive to said first sense signal for generating a first current in accordance with said magnetic field component; and
 a first magnetic field neutralizing coil fitted adjacent said cathode ray tube and coupled to said first current generating means for conducting said first current to produce, in path of said electron beam, a neutralizing second magnetic field that varies in accordance with said first sense signal such that said neutralizing second magnetic field automatically neutralizes said magnetic field component when a change in a position of said cathode ray tube occurs.

* * * * *